United States Patent
Kim et al.

(10) Patent No.: US 7,710,686 B2
(45) Date of Patent: May 4, 2010

(54) HEAT-ASSISTED MAGNETIC RECORDING HEAD AND METHOD OF MANUFACTURING THE SAME

(75) Inventors: Hae-sung Kim, Hwaseong-si (KR);
Jin-seung Sohn, Seoul (KR);
Myung-bok Lee, Suwon-si (KR);
Byung-kyu Lee, Seoul (KR);
Sung-dong Suh, Seoul (KR);
Eun-hyoung Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 690 days.

(21) Appl. No.: 11/643,761

(22) Filed: Dec. 22, 2006

(65) Prior Publication Data
US 2007/0159718 A1 Jul. 12, 2007

(30) Foreign Application Priority Data
Jan. 11, 2006 (KR) .............. 10-2006-0003113

(51) Int. Cl.
*G11B 5/127* (2006.01)
(52) U.S. Cl. .................................. 360/125.3
(58) Field of Classification Search ........ 360/125.3, 360/125.09, 125.03, 125.04, 125.17, 125.12, 360/125.16, 125.06, 125.15, 123.1, 123.01
See application file for complete search history.

(56) References Cited

U.S. PATENT DOCUMENTS

| | | | |
|---|---|---|---|
| 6,636,460 B2* | 10/2003 | Akiyama et al. | 369/13.14 |
| 6,975,580 B2 | 12/2005 | Rettner et al. | |
| 2001/0006436 A1* | 7/2001 | Akiyama et al. | 360/59 |
| 2003/0198146 A1 | 10/2003 | Rottmayer et al. | |
| 2007/0081427 A1* | 4/2007 | Suh et al. | 369/13.33 |
| 2007/0165495 A1* | 7/2007 | Lee et al. | 369/13.33 |
| 2008/0055343 A1* | 3/2008 | Cho et al. | 346/74.3 |
| 2008/0212230 A1* | 9/2008 | Suh et al. | 360/110 |
| 2008/0232225 A1* | 9/2008 | Cho et al. | 369/112.27 |

FOREIGN PATENT DOCUMENTS

| | | |
|---|---|---|
| JP | 05-189826 A | 7/1993 |
| JP | 2003-045004 A | 2/2003 |
| JP | 2003-272176 A | 9/2003 |
| JP | 2004-287224 A | 10/2004 |
| JP | 2004-334190 A | 11/2004 |
| KR | 2002-0093288 A | 12/2002 |
| WO | 2005/029164 A1 | 3/2005 |

\* cited by examiner

*Primary Examiner*—Allen T Cao
(74) *Attorney, Agent, or Firm*—Sughrue Mion, PLLC

(57) ABSTRACT

A heat-assisted magnetic recording head (HAMR) head includes a magnetic recording head including a recording pole for applying a magnetic recording field on a magnetic recording medium and a return pole magnetically connected to the recording pole to form a magnetic path, a light source for emitting light, and an optical transmission module including an photonic crystal waveguide disposed at a side of the magnetic recording head to guide light incident from the light source and a nano aperture for enhancing an optical field by varying an intensity distribution of the light guided through the photonic crystal waveguide.

18 Claims, 15 Drawing Sheets

HEAT-ASSISTED MAGNETIC RECORDING HEAD AND METHOD OF MANUFACTURING THE SAME

CROSS-REFERENCE TO RELATED PATENT APPLICATIONS

This application claims priority from Korean Patent Application No. 10-2006-0003113, filed on Jan. 11, 2006, in the Korean Intellectual Property Office, the disclosure of which is incorporated herein in its entirety by reference.

BACKGROUND OF THE INVENTION

1. Field of the Invention

The present invention relates to a heat-assisted magnetic recording head and a method of manufacturing the same and, more particularly, to a heat-assisted magnetic recording head with which an optical transmission module can be easily integrated and which can easily be changed to have an optical path in a desired direction and a method of manufacturing the same.

2. Description of the Related Art

Previously, it has been difficult to achieve a recording density above 500 Gb/in$^2$ using a conventional magnetic recording method.

In the field of magnetic information recording, many studies have been performed to overcome magnetic recording density limitations and thus achieve such a high recording density.

In order to increase recording densities, a bit size of magnetic recording mediums on which unit information is recorded must be reduced. To reduce the bit size, a grain size of the recording medium must be reduced. Since reduction of the grain size increases thermal instability of a recorded bit, a medium having a relatively high coercive force is necessary.

Since a magnetic field generated by a magnetic recording head and applied to a magnetic recording medium has a limited intensity, it is difficult to record information in a magnetic recording medium when the magnetic recording medium is formed of a material having a relatively high coercive force for providing good thermal stability.

To solve the above problem, a heat-assisted magnetic recording method has been developed, in which a recording medium formed of a material having a relatively high coercive force for overcoming the thermal instability of a small recorded bit is used and heat is locally applied to the recording medium to temporarily lower the coercive force thereof and allow the recording to be performed by a magnetic field applied by a magnetic recording head. That is, according to the heat-assisted magnetic recording method, the coercive force of a local portion of the recording medium is lowered by heating the local portion so that the heated local portion of the magnetic recording medium can be effectively magnetized to perform the recording using the magnetic field applied by the magnetic recording head. Therefore, even when the grain size of the magnetic recording medium is reduced, the thermal stability can be realized.

An optical transmission module that heats a local portion of a magnetic recording medium by emitting light to temporarily reduce the coercive force of the local portion of the recording medium and thus expedite the recording may be applied to a heat-assisted magnetic recording (HAMR) head.

FIG. 1 is a diagram of a conventional HAMR head disclosed in U.S. patent application Publication No. 2003/0198146A1.

Referring to FIG. 1, the conventional HAMR head includes a magnetic recording unit 22 and an optical transmission module for heating the magnetic recording medium 16.

The magnetic recording unit 22 includes a recording pole 30 for applying a magnetic recording field on the magnetic recording medium 16 and a return pole 32 magnetically connected by a yoke 35 to the recording pole 30 to form a magnetic path H.

The optical transmission module heats a local portion A of the magnetic recording medium 16 using a beam of light. The optical transmission module includes a light source 52 and a waveguide 50 for guiding light generated by the light source 52 through an optical fiber 54. An electromagnetic (EM) radiation emission structure 46 is attached to an extreme end of the waveguide 50 near an air bearing surface (ABS) of the magnetic recording medium 16.

The local portion A is located near to the recording pole 30 with respect to the relative motion of the magnetic recording medium 16. As a result, the recording pole 30 vertically records data on the local portion having a coercive force which has been temporarily reduced by heating. That is, magnetic recording can be performed in a state where the thermal instability is solved.

In the above-described conventional HAMR head, the optical transmission module is installed to emit the light to the magnetic recording medium 16 prior to the operation of the recording pole 30. At this point, the waveguide 50 is attached on a side portion of the recording pole 30. As the magnetic recording medium 16 rotates, dynamic air pressure is generated to provide an air-bearing effect by which the magnetic recording unit 22 is floated from the magnetic recording medium 16. At this point, a predetermined gap is maintained between the waveguide 50 and the magnetic recording medium 16.

Since the waveguide 50 collimates an incident light and guides the collimated light to the EM radiation emission structure 46, the optical path is limited to be formed in a predetermined direction. Therefore, the installation position of the light source is limited. The limitation of the installation position of the light source reduces overall design flexibility of the HAMR head as well as an actual manufacturing flexibility.

In addition, since the EM radiation emission structure 46 is separately prepared and attached to an extreme end of the waveguide 50, it is difficult to manufacture the HAMR head through a semiconductor wafer fabrication process.

SUMMARY OF THE INVENTION

The present invention provides a heat-assisted magnetic recording head that can enable high density recording by realizing a light spot having a relatively small size and can be fabricated integrally with a waveguide.

According to an aspect of the present invention, there is provided a heat-assisted magnetic recording head (HAMR) including: a magnetic recording head including a recording pole for applying a magnetic recording field on a magnetic recording medium and a return pole magnetically connected to the recording pole to form a magnetic path; a light source for emitting light; and an optical transmission module including a photonic crystal waveguide disposed at a side of the magnetic recording head to guide light emitted from the light source and a nano aperture for enhancing an optical field by varying an intensity distribution of the light guided through the photonic crystal waveguide.

The photonic crystal waveguide may include an optical waveguide line defect region where at least one line of periodicity is removed from the photonic crystal having a periodic refractivity and the optical waveguide line defect region is straight or has at least one bend.

The photonic crystal waveguide may further include a monitoring optical waveguide line defect region for inducing a part of the light guided by the optical waveguide line defect region to be used as monitoring light.

The heat-assisted magnetic recording head may further include a monitoring optical detector for monitoring an intensity of light directed to the photonic crystal waveguide by detecting the monitoring light.

The nano aperture may enhance the optical field of a specific polarization of light; and the photonic crystal waveguide has a polarization control function for guiding a specific polarization of light so that the optical field can be enhanced by the nano aperture.

The nano aperture may be one of a C-type nano aperture and a slot type nano aperture having a slot and a plurality of grooves formed around the slot.

The heat-assist magnetic recording head may further include a reading sensor provided at a location which is one of far from the magnetic recording head and far from the photonic crystal waveguide.

The heat-assisted magnetic recording head may further include a reading sensor provided at a location which is one of far from the magnetic recording head and far from the photonic crystal waveguide.

The heat-assisted magnetic recording head may further include at least one cladding layer formed between the magnetic recording head and the photonic crystal waveguide, or on a surface of the photonic crystal waveguide.

According to another aspect of the present invention, there is provided a method of manufacturing a heat-assisted magnetic recording (HAMR) head, including: forming a magnetic recording head including a recording pole for applying a magnetic recording field on a magnetic recording medium and a return pole magnetically connected to the recording pole to form a magnetic path; and forming an optical transmission module on the magnetic recording head, wherein the forming of the optical transmission module includes: depositing a waveguide layer on the magnetic recording head; forming a photonic crystal waveguide for guiding light by patterning the waveguide layer; and forming a nano aperture on an output region of the photonic crystal waveguide, the nano aperture enhancing an optical field by varying an intensity distribution of the light guided through the photonic crystal waveguide.

The photonic crystal waveguide may be formed through one of a process comprising nano-imprinting and a process of electron beam lithography and dry-etching.

The forming of the nano-aperture may include forming a metal layer on the output region of the photonic crystal waveguide; forming a photoresist layer on the photonic crystal waveguide where the metal layer is exposed; and forming the nano aperture on the metal layer through a focused ion beam process or a dry etching process and removing the photoresist layer.

The forming of the metal layer may include: coating a photoresist layer on the waveguide layer; exposing the output region of the photonic crystal waveguide, on which the nano aperture will be formed; developing the exposed region to remove the photoresist layer from the output region; depositing metal; and removing the remaining photoresist layer such that the metal layer only remains on the output region.

The method may further include, after the magnetic recording head is formed, forming at least one cladding layer between the magnetic recording head and the optical transmission module.

BRIEF DESCRIPTION OF THE DRAWINGS

The above and other features and advantages of the present invention will become more apparent by describing in detail exemplary embodiments thereof with reference to the attached drawings, in which.

DETAILED DESCRIPTION OF EXEMPLARY EMBODIMENTS OF THE INVENTION

The present invention will now be described more fully with reference to the accompanying drawings, in which exemplary embodiments of the invention are shown.

Figure 1:
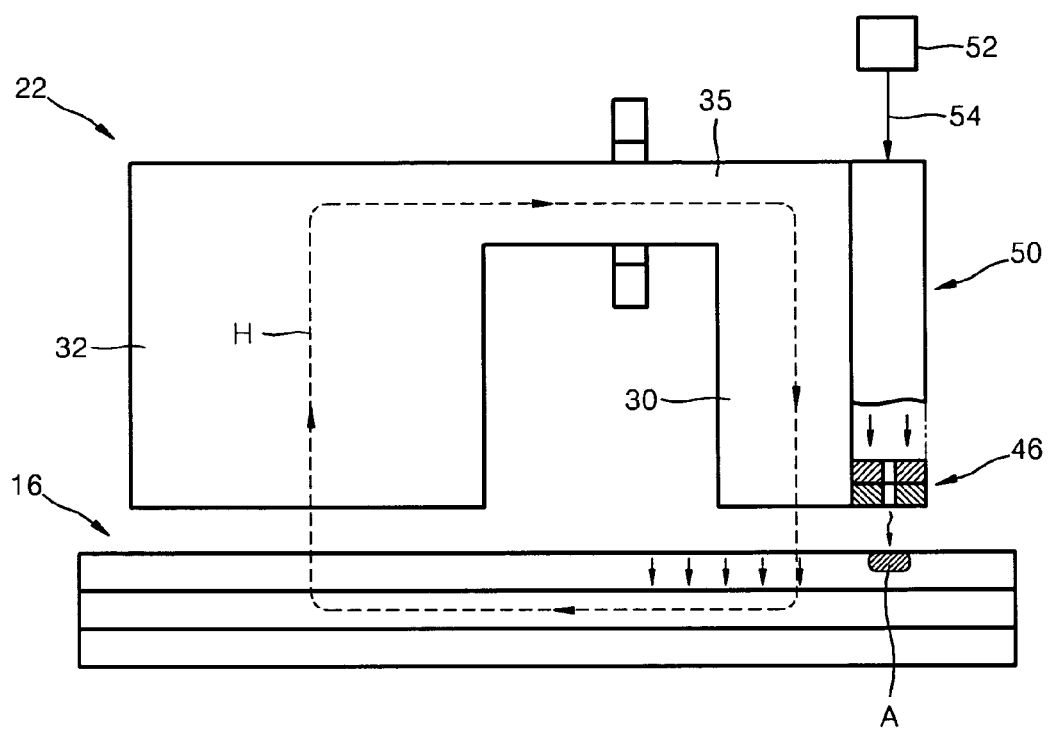
FIG. 1 is a diagram of a conventional heat-assisted magnetic recording (HAMR) head disclosed in U.S. patent application Publication No. 2003/0198146A1.
Figure 2:
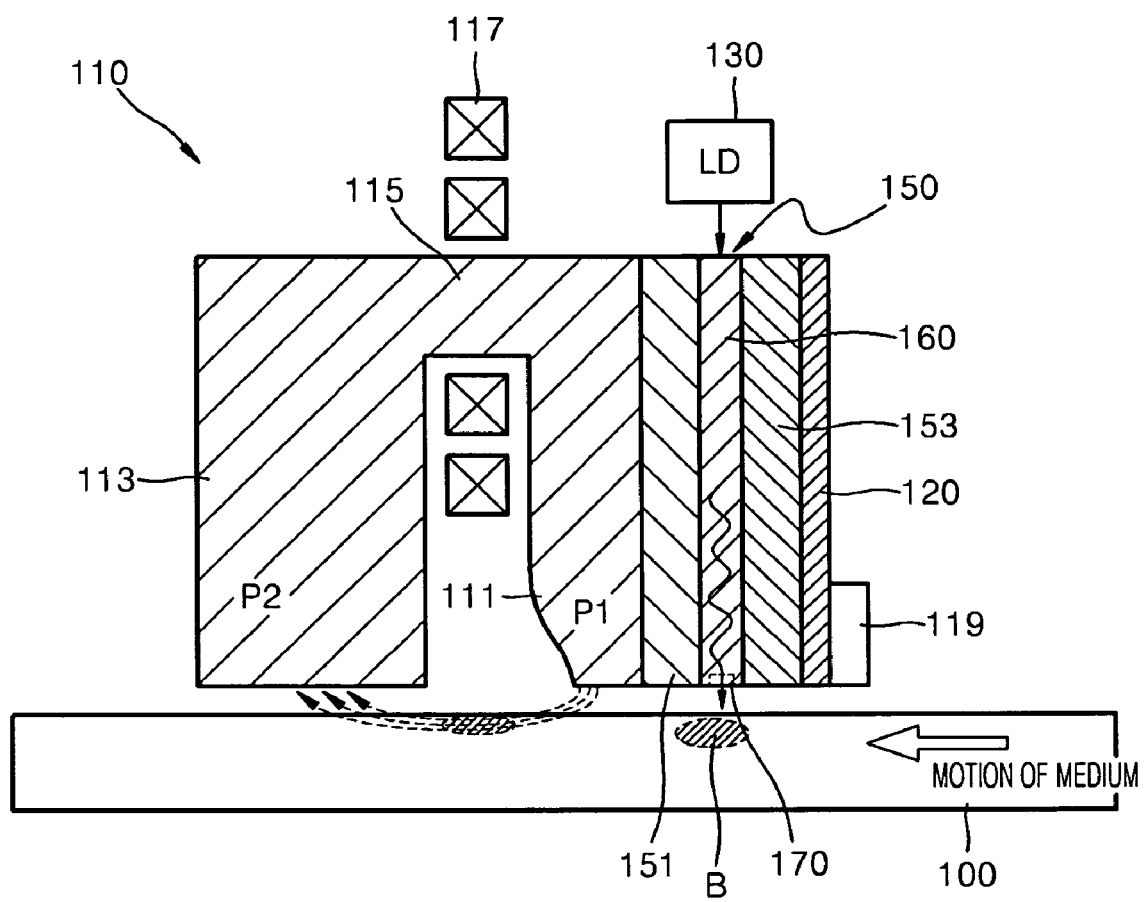
FIG. 2 is a schematic view of a HAMR head according to an exemplary embodiment of the present invention.
Figure 3:
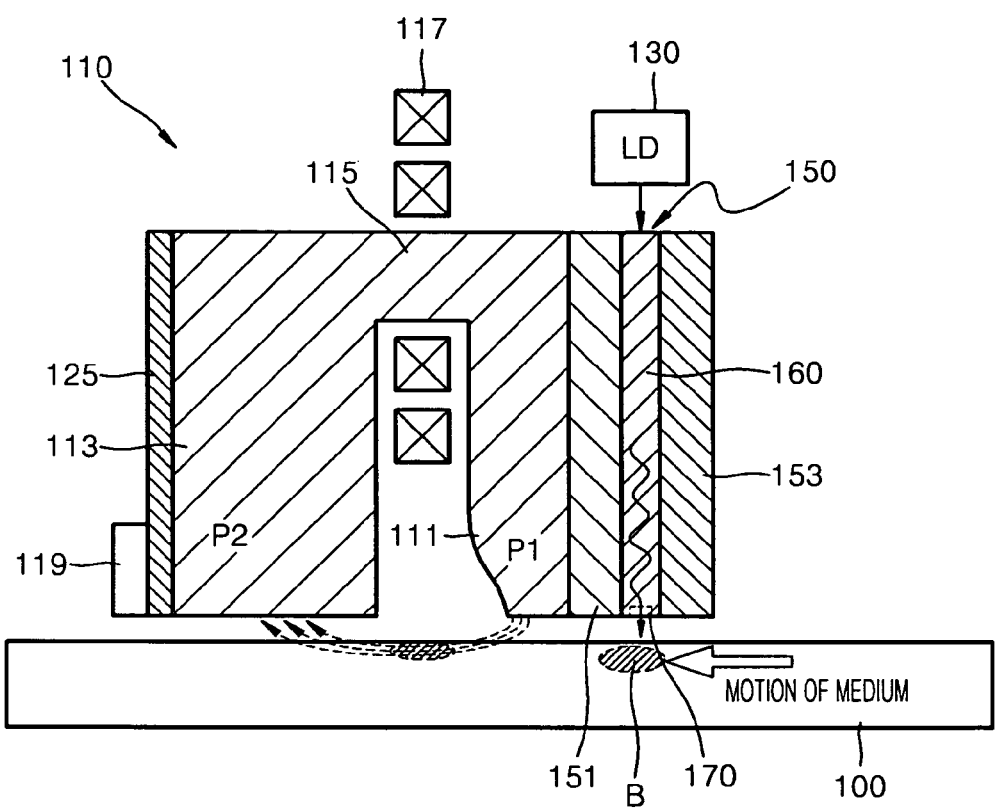
FIG. 3 is a schematic view of a HAMR head according to another embodiment of the present invention.

FIG. 2 is a schematic view of a HAMR head according to an exemplary embodiment of the present invention and FIG. 3 is a schematic view of a HAMR head according to another exemplary embodiment of the present invention.

Referring to FIGS. 2 and 3, the HAMR head includes a magnetic recording head 110, a light source 130 which emits light, and an optical transmission module 150 disposed at a side of the magnetic recording head 110 to transmit the light emitted from the light source 130. The optical transmission module 150 transmits the light emitted from the light source 130 to a portion B of a magnetic recording medium 100 to locally heat the portion of the magnetic recording medium 100 and thus temporarily reduce a coercive force of the portion B of the magnetic recording medium 100, thereby expediting recording.

The magnetic recording head 110 includes a recording pole (P1) 111 for applying a magnetic recording field on the magnetic recording medium 100 and a return pole (P2) 113 magnetically connected to the recording pole 111 to form a magnetic path. The magnetic recording head 110 further includes a yoke 115 magnetically interconnecting the recording pole 111 and the return pole 113 and an induction coil 117 enclosing the yoke 115. The induction coil 117 induces the magnetic field to the recording pole 111. The magnetic recording heads 110 illustrated in FIGS. 2 and 3 are exemplary only. The magnetic head may be formed in a variety of designs well known in the art. Since the basic constitution and function of magnetic recording heads are well known in the art, a detailed description thereof will be omitted herein.

Meanwhile, as shown in FIGS. 2 and 3, the HAMR head further includes a reading sensor 119 so that it can perform not only the recording but also reading of the magnetic recording medium 100.

FIG. 2 shows an example where the reading sensor 119, e.g., a magnetic resistor (MR) sensor is disposed near the optical transmission module 150. In this case, a shield layer 120 may be disposed between the optical transmission module 150 and the reading sensor 119.

FIG. 3 shows an example where the reading sensor, e.g., an MR sensor is disposed far from the optical transmission module 150 and near the magnetic recording head 110. In this case, a shield layer 125 may be disposed between the magnetic recording head 110 and the reading sensor 119.

In the HAMR head according to an exemplary embodiment of the present invention, the optical transmission module 150 includes a photonic crystal waveguide 160 and a nano aperture 170 enhancing an optical field by converting an optical intensity distribution of the light transmitted through the photonic crystal waveguide 160.

A laser diode (LD) may be used as the light source 130. The light source 130 is butt-coupled to an input of the photonic crystal waveguide 160 by, for example, an optical fiber.

A cladding layer may be formed on at least one surface of the photonic crystal waveguide 160. In the embodiments of FIGS. 2 and 3, cladding layers 151 and 153 are formed on surfaces of the photonic crystal waveguide 160. That is, FIG. 2 shows an exemplary embodiment where the cladding layers 151 and 153 are respectively disposed between the magnetic recording head 110 and the photonic crystal waveguide 160 and between the photonic crystal waveguide and the shield layer 120. FIG. 3 shows an exemplary embodiment where the cladding layers 151 and 153 are respectively disposed between the magnetic recording head 110 and the photonic crystal waveguide 160 and on an outer surface of the photonic crystal waveguide 160.

Figure 4A:
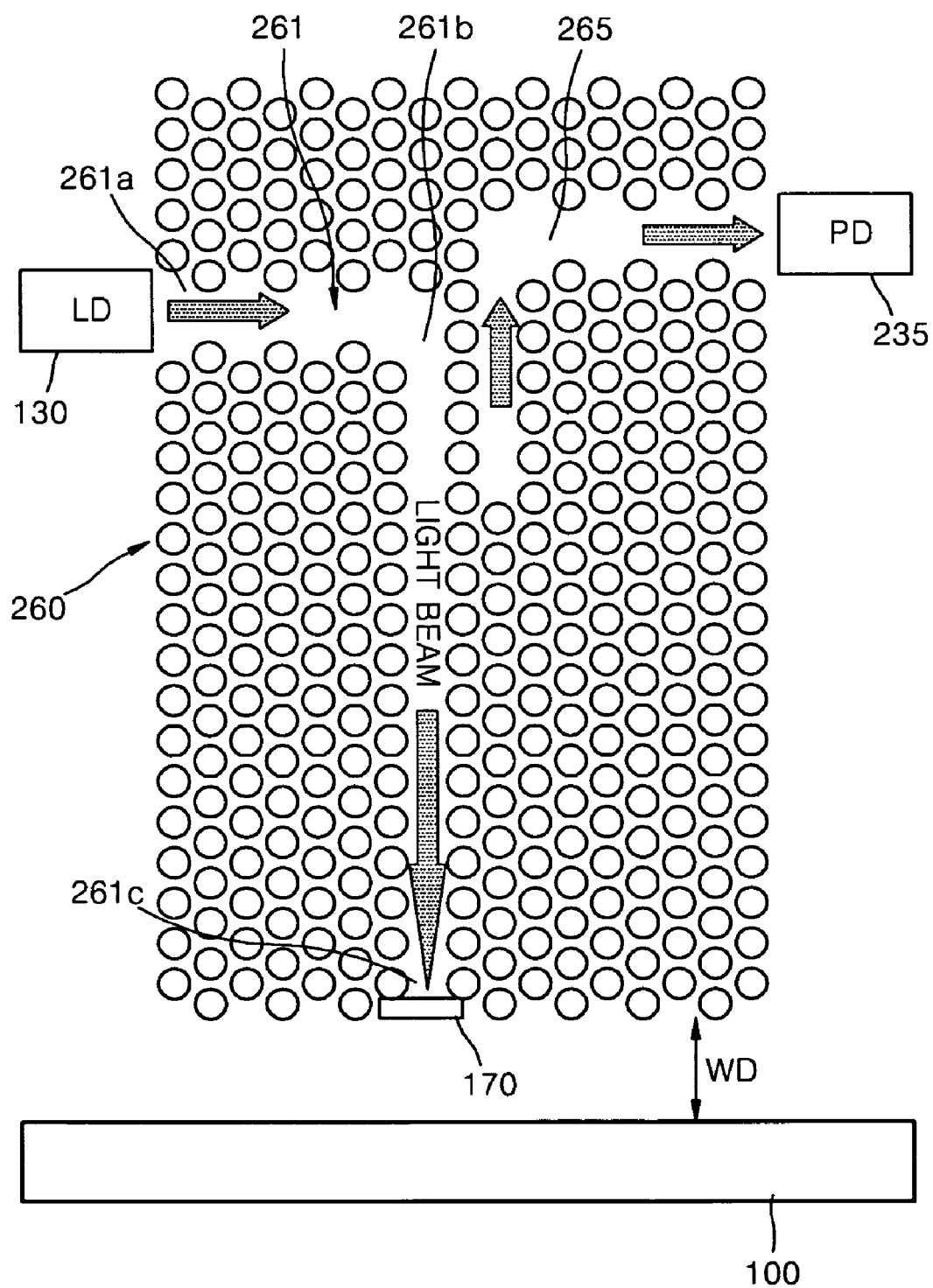
FIGS. 4A and 4B are plan views of a photonic crystal waveguide of a HAMR head according to exemplary embodiments of the present invention.
Figure 4B:
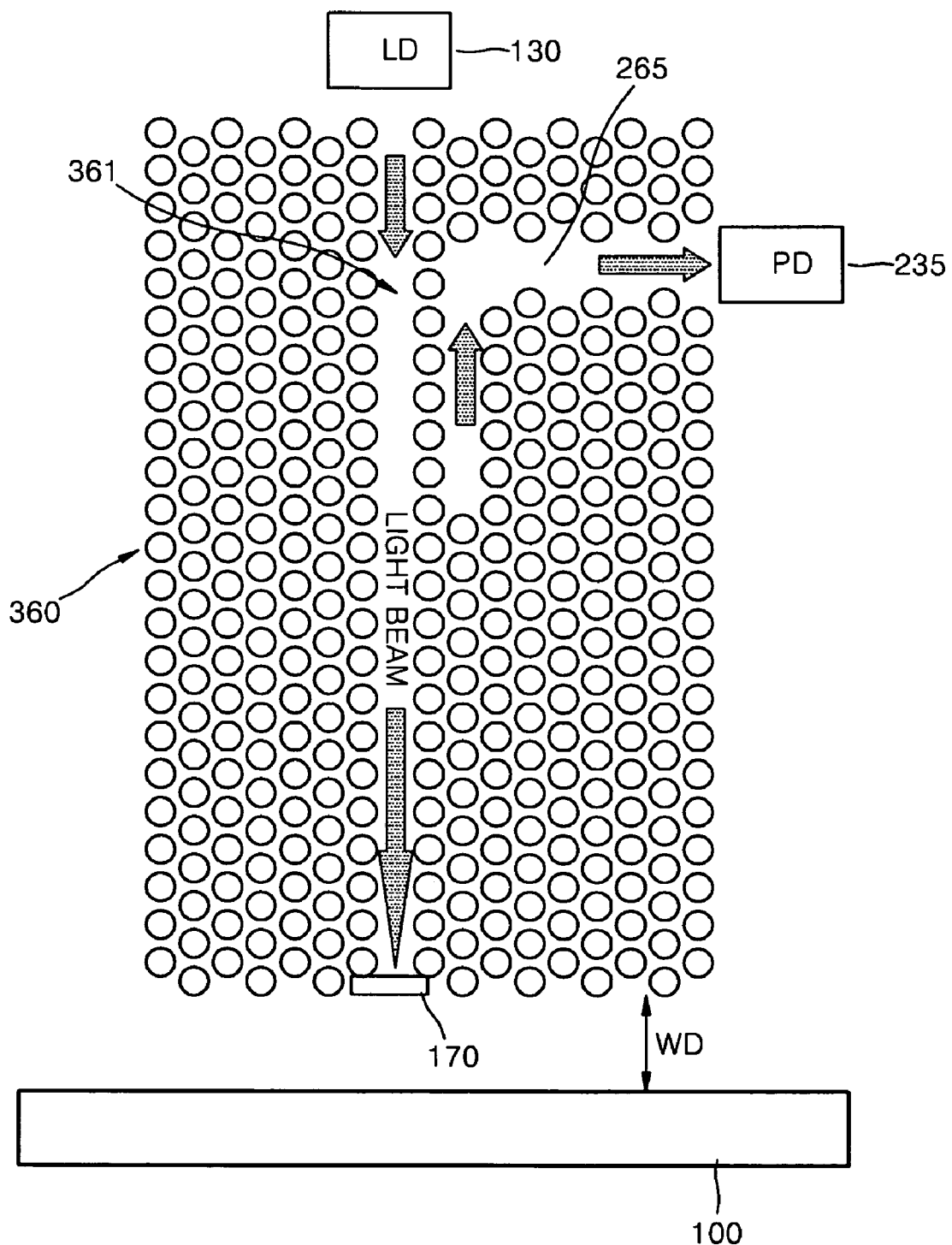

FIGS. 4A and 4B are plan views of the photonic crystal waveguide of the HAMR head according to exemplary embodiments of the present invention.

Referring to FIGS. 4A and 4B, the photonic crystal waveguide 260(360) includes an optical waveguide line defect region 261(361) where at least one line of periodicity is removed from the photonic crystal having a periodic refractivity. FIG. 4A shows an exemplary embodiment where the optical waveguide line defect region 261 has a bend 261b.

FIG. 4B shows an exemplary embodiment where the optical waveguide line defect region 361 is formed straight. That is, FIG. 4A shows a case where the optical waveguide line defect region 261 has a 90° bend. However, if required, the number of the bends may be more than one and the bending angle may vary. In FIGS. 4A and 4B, WD denotes an operational distance between the HAMR head and the magnetic recording medium 100.

As shown in FIG. 4A, the optical waveguide line defect region 261 having the bend 261b guides the light along a bent optical path. As shown in FIG. 4B, the optical waveguide line defect region 261 guides the light along a straight optical path.

A conventional two-dimensional planar optical waveguide cannot guide the light while changing the optical path by 90°. However, the photonic crystal waveguide can guide the light while changing the optical path by 90° without any transmission loss.

As the optical waveguide defect region is formed on the photonic crystal waveguide 160, the light can be guided along the bent optical path as shown in FIG. 4A or the light can be guided along the straight optical path as shown in FIG. 4B. That is, the optical path can be formed having various shapes, and thus, with less restrictions and limitations. That is, in the HAMR head consistent with the present invention, the optical path is not limited to a predetermined shape. Therefore, the installation location of the light source 130 is not limited to a specific location. That is, the installation location of the light source 130 can be varied by changing the optical waveguide line defect region of the photonic crystal waveguide 160.

In the HAMR head consistent with the present invention, a flexibility of the installation location of the light source 130 can be improved compared with conventional magnetic recording heads. The optical path can be freely formed. Therefore, the overall design flexibility of the HAMR head can be improved.

As shown in FIGS. 4A and 4B, the photonic crystal waveguide 260(360) may further include a monitoring optical waveguide line defect region 265 for inducing and guiding a portion of the light which is guided by the optical waveguide line defect region 261(361), as monitoring light. In addition, the HAMR head further includes a monitoring optical detector (PD) 235 for receiving the monitoring light guided along the monitoring optical waveguide line defect region 265 and monitoring an intensity of light introduced to the photonic crystal waveguide 260(360).

The monitoring optical waveguide line defect region 265 may be formed close to the optical waveguide line defect region 261(361) such that a portion of the light guided along the optical waveguide line defect region 261(261) can be induced into the monitoring optical waveguide line defect region 265 by mode hopping.

By forming the monitoring optical waveguide line defect region 265 in the photonic crystal waveguide 260 (360) and providing the monitoring optical detector 235 for monitoring the portion of light, the intensity of the light emitted from the light source 130 can be controlled according to a detected signal of the monitoring optical detector 235 such that an optimal intensity of the light used to lower the coercive force of the recording medium 100 to a desired level can be emitted on the magnetic recording medium 100.

Meanwhile, the nano aperture 170 can more effectively enhance an optical field with respect to a specific polarization of light. This will be described in more detail later. Therefore, the photonic crystal waveguide 160 may have a polarization control function for guiding only a specific polarization of light suitable for the nano aperture 170 toward the nano aperture 170 so that the optical field enhancement can be more effectively realized by the nano aperture 170.

Figure 4C:
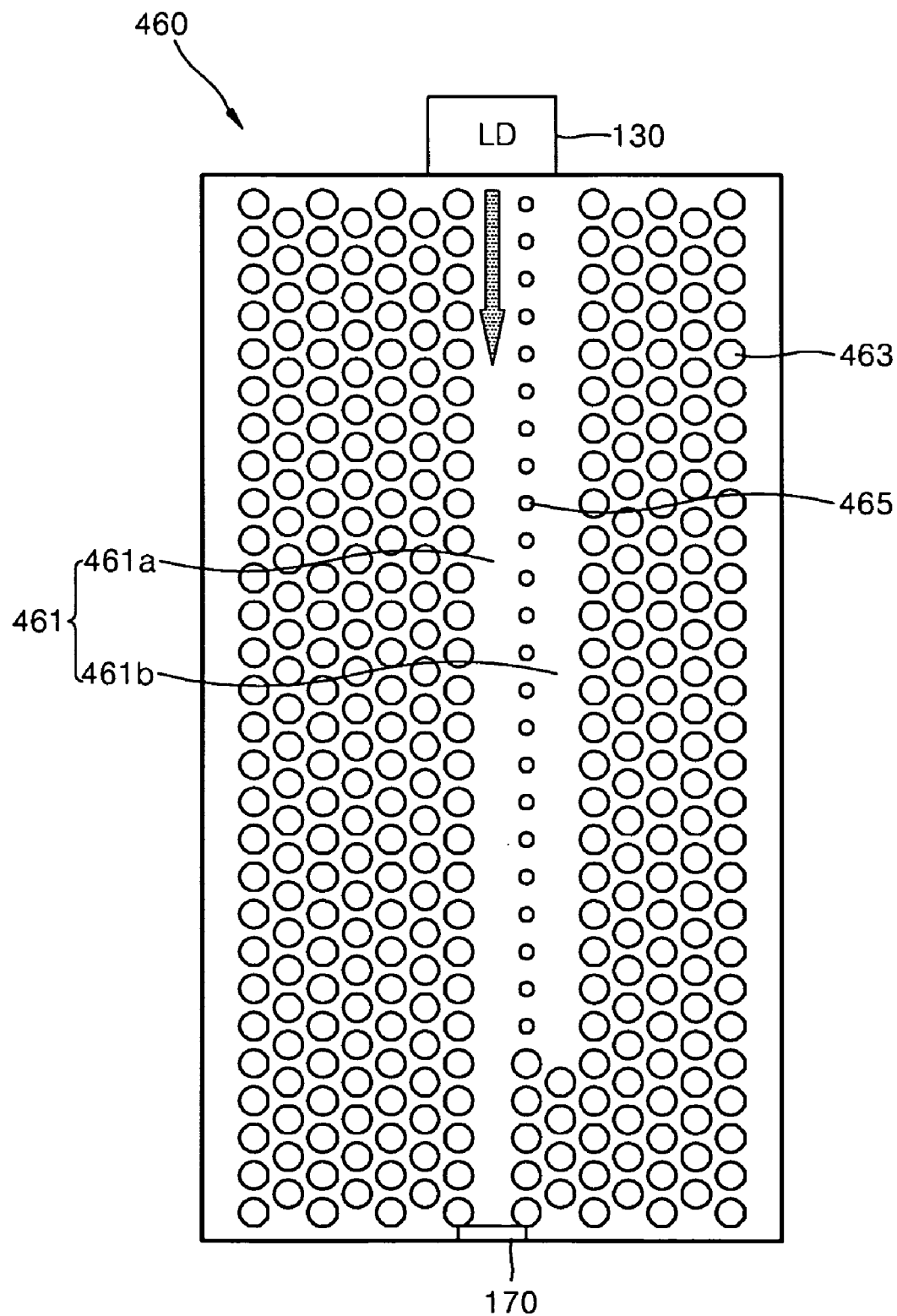
FIGS. 4C and 4D are plan views of a photonic crystal waveguide on which an optical waveguide line defect region is formed having a polarization control function according to an exemplary embodiment of the present invention.
Figure 4D:
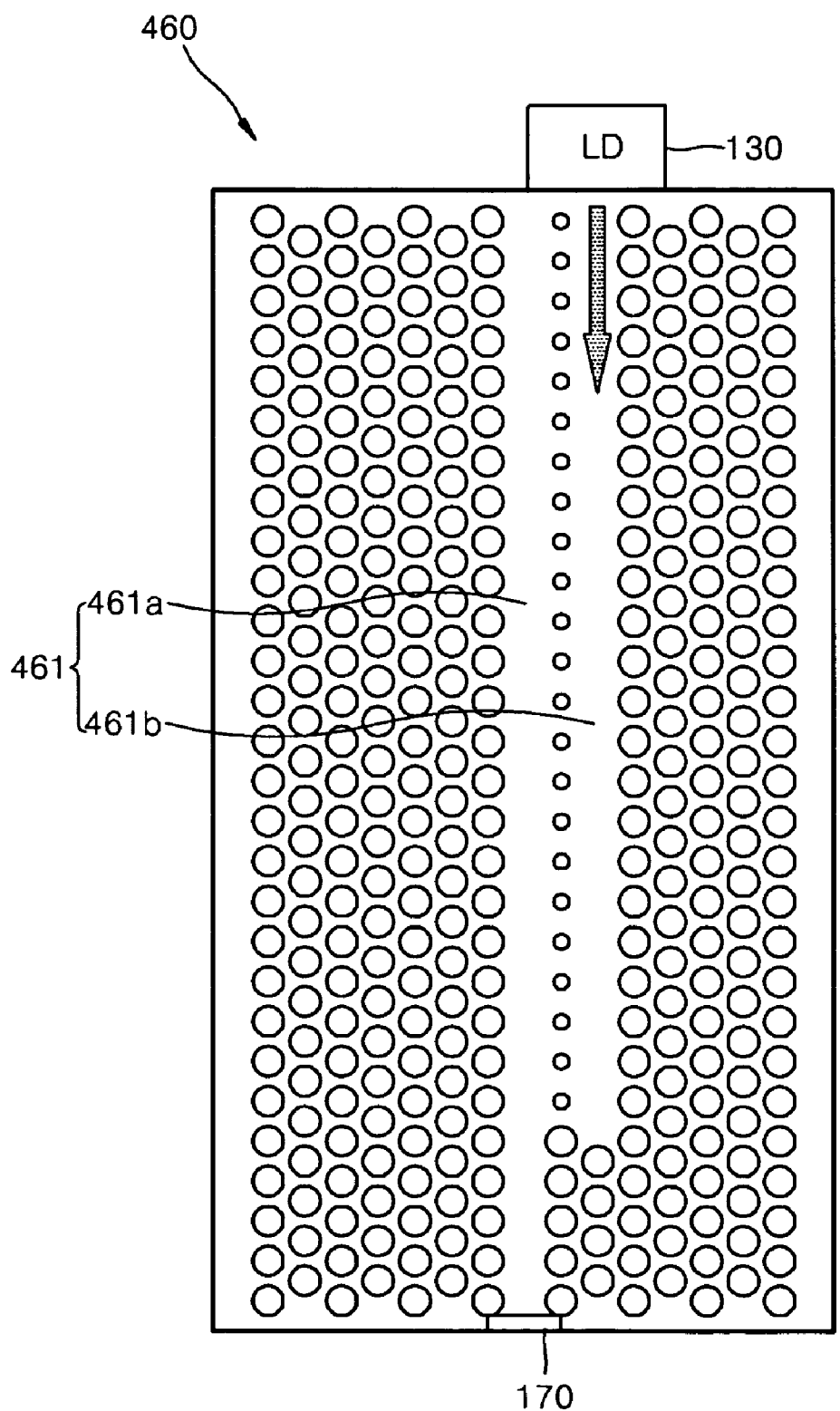

FIGS. 4C and 4D are plan views of a photonic crystal waveguide on which an optical waveguide line defect region is formed having a polarization control function according to an exemplary embodiment of the present invention.

Referring to FIGS. 4C and 4D, a photonic crystal waveguide 460 includes an optical waveguide line defect region 461. The optical waveguide line defect region 461 includes a first optical waveguide line defect region 461a extending from a light input to a light output and a second optical waveguide line defect region 461b disposed near the first waveguide line defect region 461a and having a light input and a closed end where photonic crystal exists.

When the photonic crystal waveguide 460 is formed of photonic crystal having first air holes 463 arranged in a predetermined pattern, second air holes 465 formed between the first and second optical waveguide line defect regions 461a and 461b have a diameter less than that of the first air holes 463 as shown in FIGS. 4C and 4D.

In the photonic crystal waveguide 460, the light polarized in a TE mode travels without being transferred to the second optical waveguide line defect region 461b. The light polarized in a TM mode is transferred to the second optical waveguide line defect region 461b.

Therefore, when the nano aperture 170 is formed such that the optical field can be enhanced for the light polarized in the TE mode, as shown in FIG. 4C, the light source 130 may be installed such that the light can be inputted through the input of the first optical waveguide line defect region 461a. In this case, the light polarized in the TE mode is guided to the nano aperture 170 by the photonic crystal waveguide 460.

When the nano aperture 170 is formed such that the optical field can be enhanced for the light polarized in the TM mode, the light source 130 may be installed such that the light can be inputted through the input of the second optical waveguide line defect region 461b, as shown in FIG. 4D. In this case, the light polarized in the TM mode is guided to the nano aperture 170 by the photonic crystal waveguide 460.

When the photonic crystal waveguide 460 of FIGS. 4C and 4D is applied in the HAMR head of the present invention, since only the light of a desired polarization is guided by determining the installation location (the input of the first optical waveguide line defect region 461a or the input of the second optical waveguide line defect region 461b) with respect to the structure of the nano aperture 170, it is easy to align the light source 130.

As described above, when the HAMR head using the photonic crystal waveguide 460 having the polarization control function according to an exemplary embodiment of the present invention, the photonic crystal waveguide 460 can guide the light of a specific polarization. Therefore, when the light source 130 is coupled to the photonic crystal waveguide 460, the alignment considering the polarization direction is not restricted.

In addition, since the optical waveguide 460 functioning as not only a polarizer but also a waveguide can be formed of photonic crystal through a planar process of a wafer level, the manufacture and structure thereof can be simplified. The photonic crystal waveguide 460 of FIGS. 4C and 4D is exemplary only and thus the structure of the photonic crystal waveguide of the present invention is not limited thereto.

In contrast, when a conventional optical waveguide is used, an additional polarizer is required to obtain light polarized in a specific direction with respect to the nano aperture. This causes the optical transmission module to be bulky. Furthermore, the light polarized in a specific direction must be accurately aligned and directed to the optical waveguide with respect to the structure of the nano-aperture. However, it is not easy to accurately align the light. In addition, when there are structural defects or manufacture defects in a conventional optical waveguide, the light guide efficiency is deteriorated due to light scattering and the light polarization may be affected.

As described above, when a HAMR head uses a conventional optical waveguide and thus the polarizer is applied to the optical transmission module, the overall size of the HAMR head increases and the overall assembling structure is complicated.

FIGS. 4C and 4D show only a portion of the optical waveguide line defect region 461 of the photonic crystal waveguide 460. That is, the optical waveguide line defect region 461 may be formed straight as shown in FIG. 4A or formed having at least one bend as shown in FIG. 4B. In addition, the monitoring optical waveguide line defect region (265 of FIGS. 4A and 4B) for inducing monitoring light using the mode hopping may be further provided at a side portion of one of the first and second optical waveguide line defect regions 461a and 461b.

Referring again to FIGS. 2 and 3, the nano aperture 170 is formed to enhance a near-field intensity of light by varying a distribution of an optical energy transferred through the photonic crystal waveguide 160. The nano aperture 170 is formed at the output of the optical waveguide line defect region of the photonic crystal waveguide 160 (e.g., at the output of the optical waveguide line defect region 261(361 or 461) of the photonic crystal waveguide 260 (360 or 460)). The nano aperture 170 may be formed of a highly conductive metal that can generate or excite a surface plasmon. For example, the nano aperture 170 may be formed of a material selected from Au, Ag, Pt, Cu, Al, and an alloy thereof.

The light emitted from the light source 130 and transferred through the photonic crystal waveguide 160 generates and excites the surface plasmon while passing through a near-field aperture (i.e., the nano aperture 170) formed of a metal. As a result, a highly efficient beam of light having a small spot diameter of tens of nanometers is incident on the magnetic recording medium 100, thereby heating the portion B of the magnetic recording medium 100.

Figure 5A:
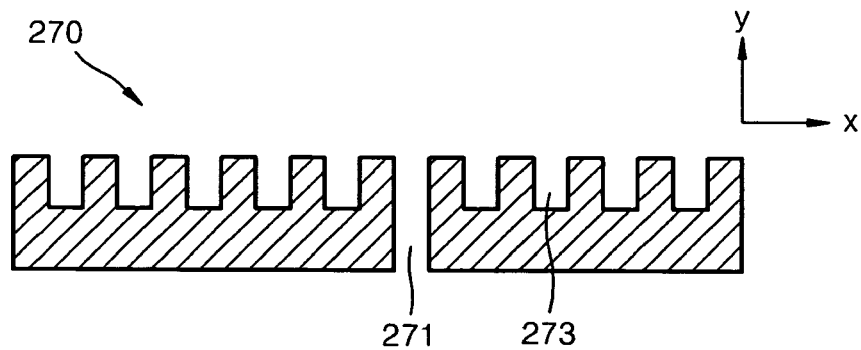
FIG. 5A is a sectional view of a slot type nano aperture according to an exemplary embodiment of the present invention.
Figure 5B:
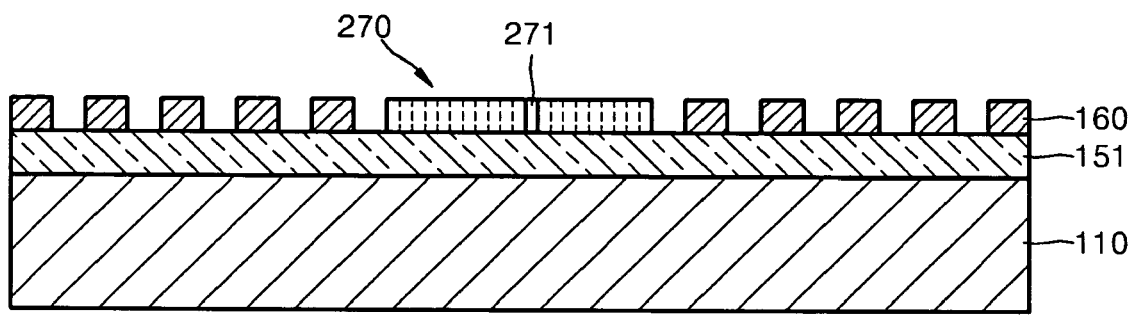
FIG. 5B is a sectional view of the slot type nano aperture of FIG. 5A and a photonic crystal waveguide viewed from the output of the photonic crystal waveguide according to an exemplary embodiment of the present invention.
Figure 5C:
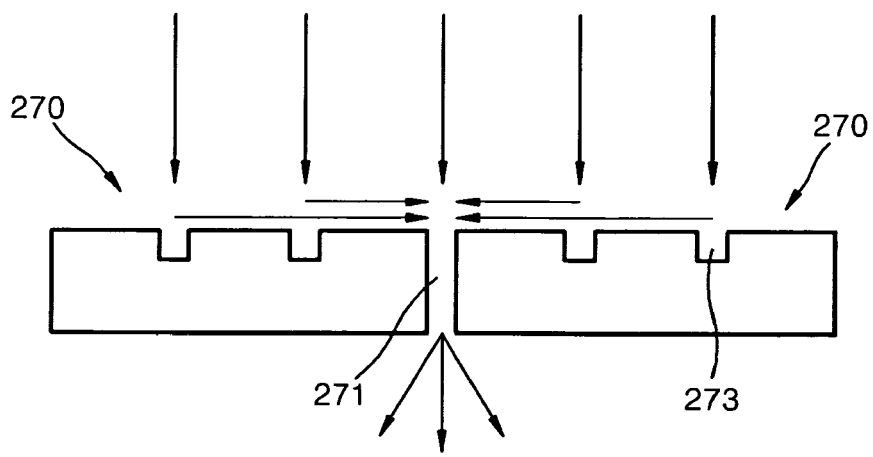
FIG. 5C is a diagram illustrating an optical field enhancement by a surface plasmon generated in the slot type nano aperture of FIG. 5B.

The nano aperture 170 may be formed in a slot type nano aperture 270 as shown in FIGS. 5A and 5B. FIG. 5A is a sectional view of the slot type nano aperture 270 according to an exemplary embodiment of the present invention; FIG. 5B is a sectional view of the slot type nano aperture 270 and the photonic crystal waveguide 160 viewed from the output of the photonic crystal waveguide 160 according to an exemplary embodiment of the present invention; and FIG. 5C is a diagram illustrating an optical field enhancement by a surface plasmon generated in the slot type nano aperture 270 of FIG. 5A.

The plurality of grooves 273 formed around the slot 271 generates the surface plasmon. As shown in FIG. 5C, a surface wave is generated by the surface plasmon to allow the optical transmission and the optical field to be enhanced at the slot 271 having a width less than a wavelength. The plurality of the grooves 273 may also be formed as wrinkle type grooves 293 as shown in FIG. 5E.

Figure 5D:
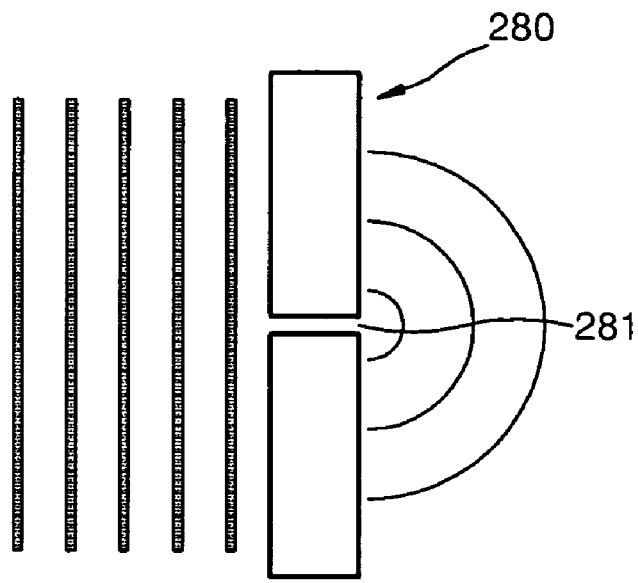
FIG. 5D is a diagram illustrating low light transmission using a nano aperture with no grooves.
Figure 5E:
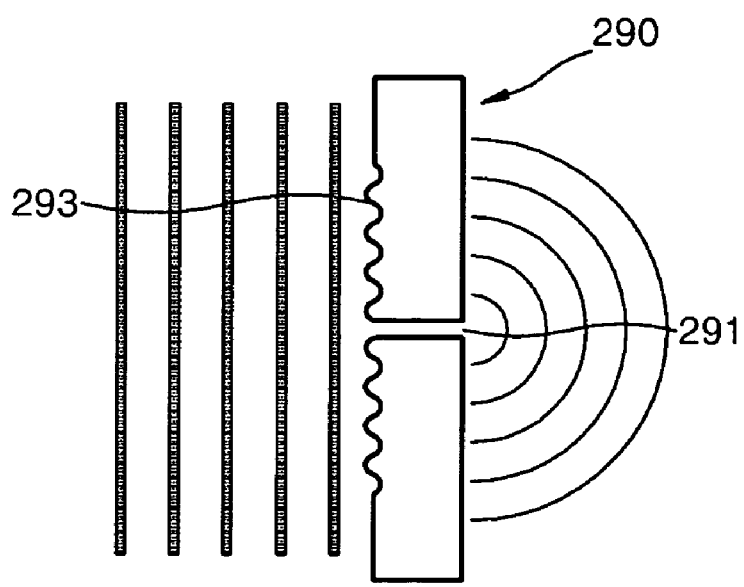
FIG. 5E is a diagram illustrating an enhanced light transmission a slot type nano aperture having wrinkle type grooves formed around the slot is used, according to an exemplary embodiment of the present invention.

FIG. 5D is a diagram illustrating low light transmission using a nano aperture 280 with no grooves and FIG. 5E is a diagram illustrating an enhanced light transmission when a slot type nano aperture 290 having wrinkle type grooves 293 formed around the slot 291 is used according to an exemplary embodiment of the present invention. Referring to FIG. 5D, the light transmission is very low when the nano aperture 280 has only a slot 281 having a width less than the wavelength and thus the light transmission is realized only by diffraction. Referring to FIG. 5E, the optical field can be enhanced when the slot type nano aperture 290 includes the slot 291 having a width less than the wavelength and wrinkle type grooves 293 formed around the slot 291.

Figure 6A:
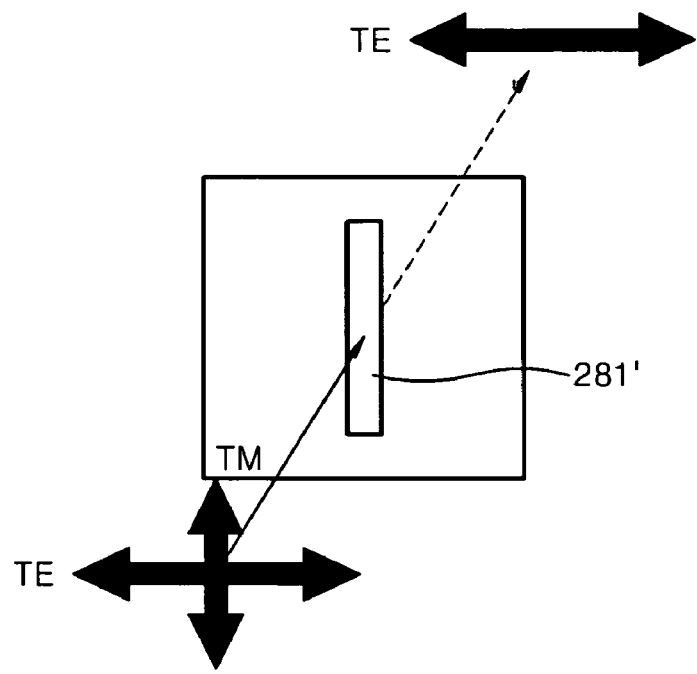
FIGS. 6A and 6B are diagrams illustrating that only light having a specific polarization can pass through a normal slot.
Figure 6B:
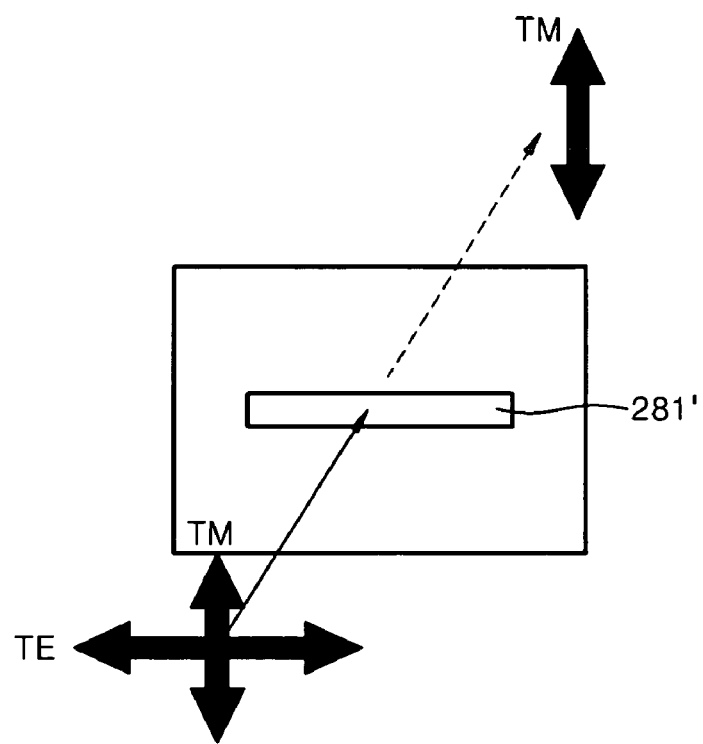

FIGS. 6A and 6B are diagrams illustrating that only light having a specific polarization can pass through a normal slot 281'. That is, light polarized in a width direction of the slot 281' can pass through the slot 281'.

Therefore, when the slot type nano aperture 270 is designed such that the photonic crystal waveguide 160 is formed to transfer the light polarized in the width direction of the slot 271 of the slot type nano aperture 270, or the direction of the specific polarization of light guided by the photonic crystal waveguide is identical to the width direction of the slot 271, the near-field intensity of light can be enhanced.

Figure 7A:
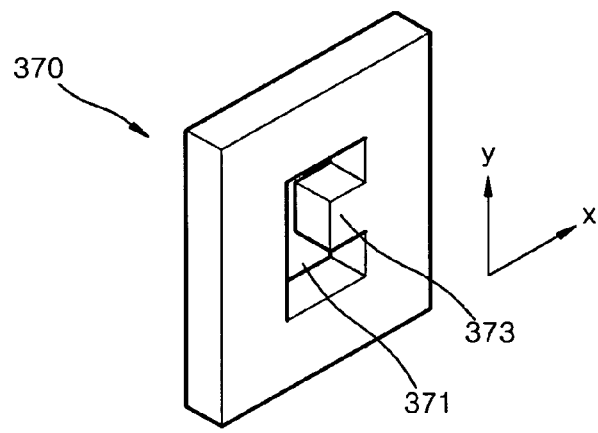
FIG. 7A is a perspective view of a C-type nano aperture according to an exemplary embodiment of the present invention.
Figure 7B:
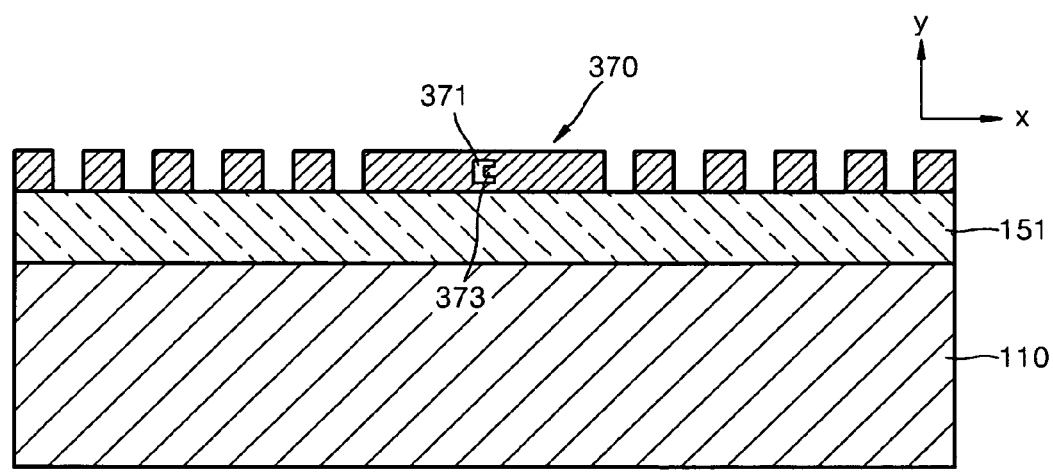
FIG. 7B is a sectional view of the C-type nano aperture and the photonic crystal waveguide viewed from the output of the photonic crystal waveguide according to an exemplary embodiment of the present invention.

Meanwhile, as shown in FIGS. 7A and 7B, the nano aperture may be a C-type nano aperture 370. FIG. 7A is a sectional view of the C-type nano aperture 370 according to an exemplary embodiment of the present invention, and FIG. 7B is a sectional view of the C-type nano aperture 370 and the photonic crystal waveguide 160 viewed from the output of the photonic crystal waveguide 160 according to an exemplary embodiment of the present invention.

The nano aperture 370 is not limited to the two types described above. For example, the nano aperture 370 may be a bow-tie antenna type nano aperture.

Referring to FIGS. 7A and 7B, the C-type nano aperture 370 has a protrusion 373 protruding toward a through-hole 371. Due to the protrusion 373, the electric field is enhanced by electric dipole vibration at the center portion of the through-hole 371, thereby concentrating wide optical energy on a local portion. When the protrusion 373 protrudes in parallel with the X-axis, the C-type nano aperture 370 enhances the optical field for the light polarized in a direction parallel to the X-axis. FIG. 7B shows an example where the C-type nano aperture 370 enhances the optical field for light parallel to the plane of the photonic crystal waveguide 160 (i.e., light polarized in the TM mode).

Therefore, when the C-type nano aperture 370 is designed such that the photonic crystal waveguide 160 is formed to transfer the light polarized in the direction parallel to the direction in which the protrusion 373 protrudes or the direction of the specific polarization guided by the photonic crystal waveguide 160 is identical to the direction in which the protrusion 373 protrudes, the intensity of the near-field intensity can be enhanced.

The nano aperture 170(270) is formed on the output of the photonic crystal waveguide 160 through a wafer fabrication process (i.e., a semiconductor batch process).

A method of manufacturing the HAMR heads of FIGS. 2 and 3 will now be described with reference to FIGS. 8A through 8L.

FIGS. 8A through 8L are diagrams for illustrating a method of manufacturing a HAMR head according to an exemplary embodiment of the present invention. An inventive method of manufacturing the HANR head includes a process for forming the magnetic recording head 110 (see FIG. 8A) and a process for forming the optical transmission module on the magnetic recording head 110 (see FIGS. 8B through 8I).

Figure 8A:
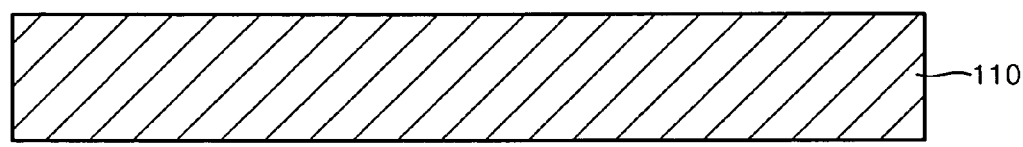
FIG. 8A through 8L are diagrams for illustrating a method of manufacturing a HAMR head according to an exemplary embodiment of the present invention.
Figure 8B:
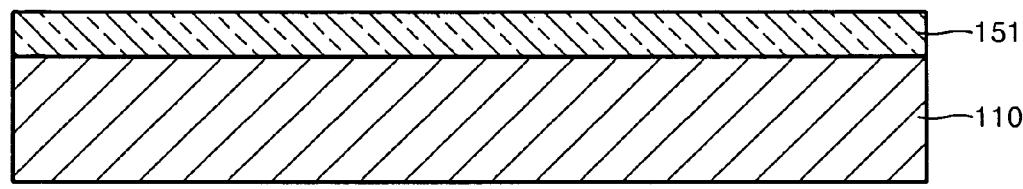

Referring first to FIGS. 8A and 8B, the magnetic recording head 110 having the recording pole and the return pole is first formed and then a first cladding layer 151 is formed on the magnetic recording head 110.

Figure 8C:
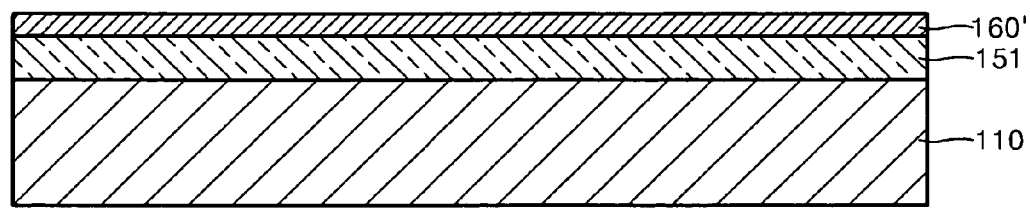

Next, as shown in FIG. 8C, a waveguide layer 160' is deposited on the first cladding layer 151.

Figure 8D:
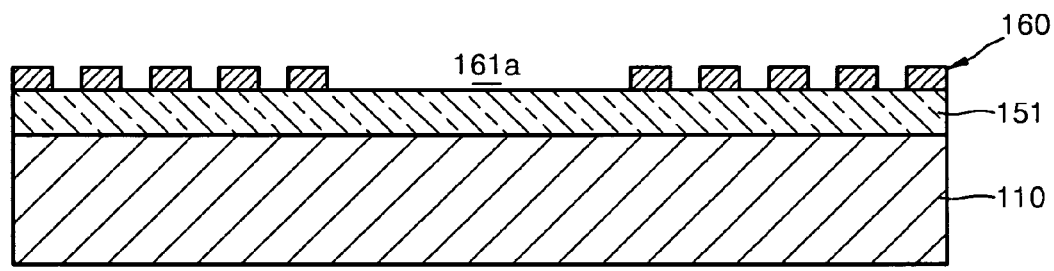

Then, as shown in FIG. 8D, the waveguide layer 160' is processed to have a predetermined pattern to form the photonic crystal waveguide 160 for guiding the light. The photonic crystal waveguide 160 is formed by processing the waveguide layer 160' using a nano-imprinting or an electron beam lithography and a dry etching.

The reference numeral 161a denotes an output region.

After the above, as shown in FIGS. 8E through 8I, the nano aperture 170 is formed on the output region 161a of the photonic crystal waveguide 160.

FIGS. 8E through 8H are diagrams for illustrating a process for forming a metal layer 175 on the output region 161a according to an exemplary embodiment of the present invention.

A process for forming the metal layer 175 on the output region 161a will now be described.

Figure 8E:
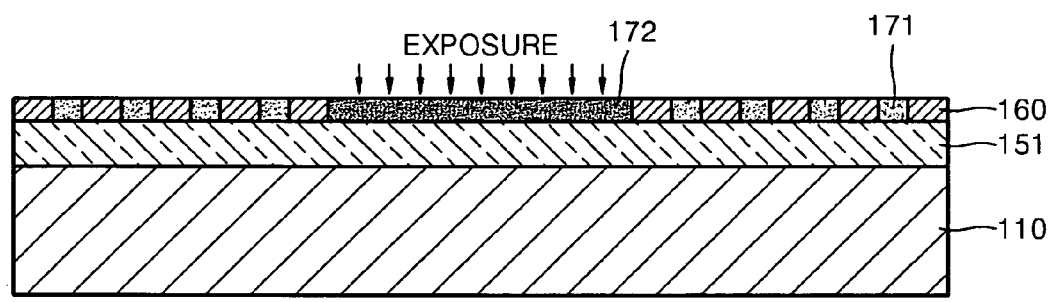

Referring to FIG. 8E, a photoresist 171 is first coated on the photonic crystal waveguide 160 and then the output region 161a is exposed. The reference numeral 172 in FIG. 8E denotes the exposed region.

Figure 8F:
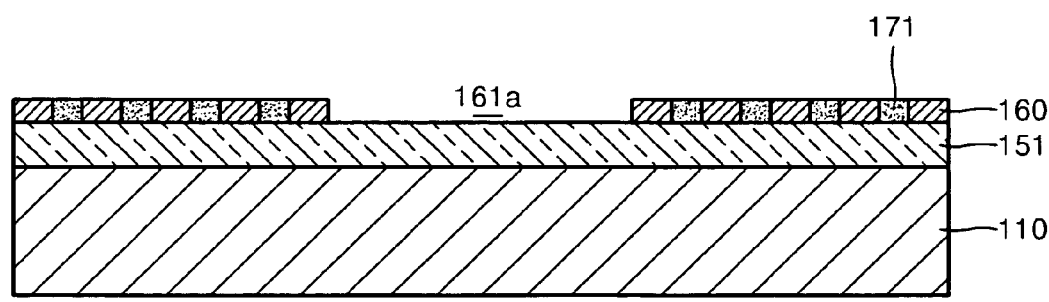

Referring to FIG. 8F, the exposed region 172 (see FIG. 8E) is developed to remove the photoresist 171 from the output region 161a.

Figure 8G:
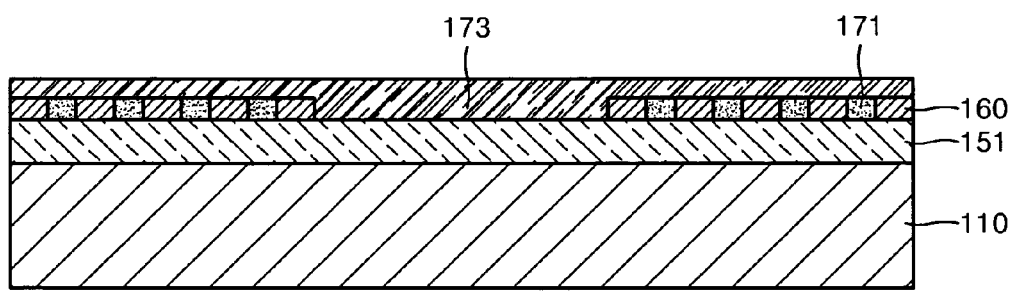

Referring to FIG. 8G, a metal layer 173 is deposited on the output region 161a and the remaining photoresist 171.

Figure 8H:
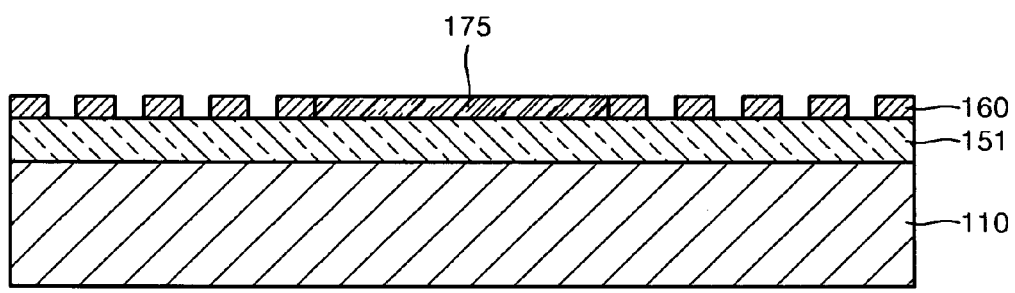

Next, referring to FIG. 8H, the remaining photoresist 171 is removed through a lift-off process so that only the metal layer 175 remains on the output region 161a.

Figure 8I:
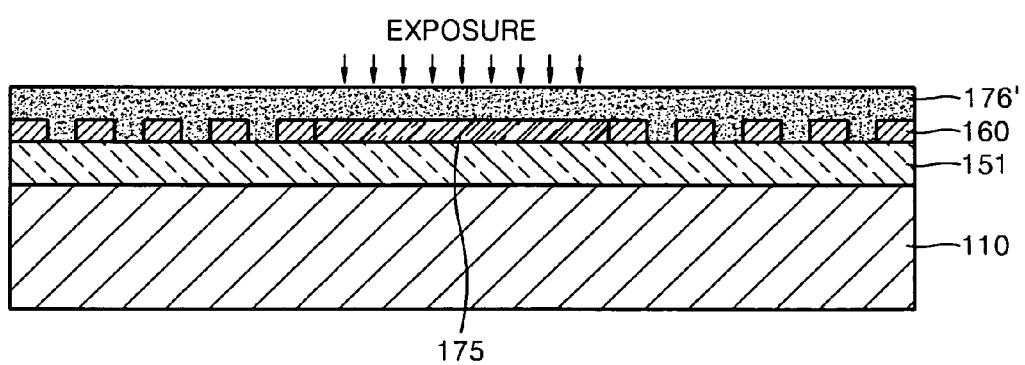
Figure 8J:
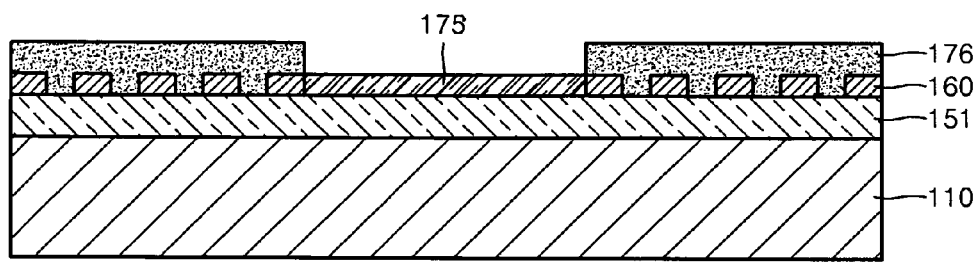

FIGS. 8I and 8J are diagrams for illustrating a process for forming a photoresist layer 176 such that only the metal layer 175 on the output region 161a is exposed according to an exemplary embodiment of the present invention.

That is, referring to FIG. 8I, a photoresist 176' is coated on not only the metal layer 175 existing on the output region 161a but also the photonic crystal waveguide 160. Then, as shown in FIG. 8J, through exposing and developing processes or nano-imprinting or releasing processes, the photoresist layer 176 is formed such that only the metal layer 175 existing on the output region 161a is exposed.

Figure 8K:
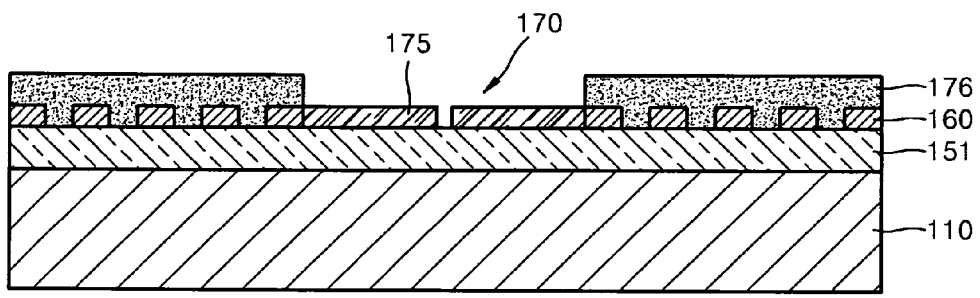
Figure 8L:
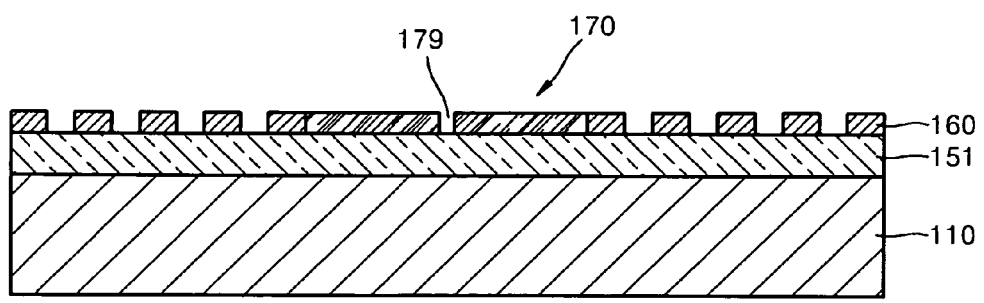

Next, referring to FIG. 8K, the nano aperture 170 is formed on the metal layer 175 through a focused ion beam process or a dry etching process and then the photoresist layer 176 is removed so that, as shown in FIG. 8L, the nano aperture 170 is formed on the output region 161a.

In FIGS. 8K and 8L, the nano aperture 170 is the slot type nano aperture having the slot 179.

After the above, if required, a second cladding layer (not shown) may be further formed on a side of the structure shown in FIG. 8L. In addition, when it is intended to form the reading sensor near the photonic crystal waveguide 160, the shielding layer is formed on the second cladding layer and the reading sensor on an end portion of the shielding layer facing the magnetic recording medium.

As described above, the HAMR head of the present invention can be integrated through the wafer fabrication process according to an exemplary embodiment of the present invention.

That is, since the planar photonic crystal waveguide 160 and the nano aperture 170 are integrally formed with the magnetic recording head in the semiconductor batch process, it becomes possible to integrate the HAMR head (including the magnetic head and the optical transmission module 150).

Since the HAMR head can be manufactured through the wafer batch process of the present invention, the processing time can be reduced and the process is simplified, thereby reducing the manufacturing costs and increasing precision.

In addition, since the installation of the light source is less restricted, a size reduction becomes possible. That is, since the light source can be installed on a suitable location such that its size can be minimized, the overall size of the HAMR head can be reduced.

Furthermore, since the photonic crystal waveguide that can be two-dimensionally processed is used, the optical properties of low loss and high efficiency can be realized and the polarization control can be easily performed. In addition, since there is no need for an additional polarizer, the size of the HAMR head can be further reduced.

As the magnetic recording head having a planar structure and the optical transmission module can be integrated, the size of the HAMR head can be further reduced.

According to the present invention, since the HAMR head uses the photonic crystal waveguide, the installation of the light source is less restricted. In addition, the magnetic recording head and the optical transmission module can be integrated through the wafer fabrication process.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A heat-assisted magnetic recording (HAMR) head comprising:
    a magnetic recording head including a recording pole for applying a magnetic recording field on a magnetic recording medium and a return pole magnetically connected to the recording pole to form a magnetic path;
    a light source for emitting light; and
    an optical transmission module including a photonic crystal waveguide disposed at a side of the magnetic recording head to guide light emitted from the light source and a nano aperture for enhancing an optical field by varying an intensity distribution of the light guided through the photonic crystal waveguide,
    wherein the photonic crystal waveguide includes an optical waveguide line defect region where at least one line of periodicity is removed from photonic crystal having a periodic refractivity and the optical waveguide line defect region is straight or has at least one bend.

2. The HAMR head of claim 1, wherein the photonic crystal waveguide further includes a monitoring optical waveguide line defect region for inducing a part of the light guided by the optical waveguide line defect region to be used as monitoring light.

3. The HAMR head of claim 2, further comprising a monitoring optical detector for monitoring an intensity of light directed to the photonic crystal waveguide by detecting the monitoring light.

4. The HAMR head of claim 1, further comprising a reading sensor provided at a location which is one of far from the magnetic recording head and far from the photonic crystal waveguide.

5. The HAMR head of claim 1, further comprising at least one cladding layer formed between the magnetic recording head and the photonic crystal waveguide, or on a surface of the photonic crystal waveguide.

6. A heat-assisted magnetic recording (HAMR) head comprising:
    a magnetic recording head including a recording pole for applying a magnetic recording field on a magnetic recording medium and a return pole magnetically connected to the recording pole to form a magnetic path;
    a light source for emitting light; and
    an optical transmission module including a photonic crystal waveguide disposed at a side of the magnetic recording head to guide light emitted from the light source and a nano aperture for enhancing an optical field by varying an intensity distribution of the light guided through the photonic crystal waveguide,
    wherein the nano aperture enhances the optical field of a specific polarization of light; and
    the photonic crystal waveguide has a polarization control function for guiding a specific polarization of light so that the optical field can be enhanced by the nano aperture.

7. The HAMR head of claim 6, wherein the nano aperture is one of a C-type nano aperture and a slot type nano aperture having a slot and a plurality of grooves formed around the slot.

8. The HAMR head of claim 6, further comprising a reading sensor provided at a location which is one of far from the magnetic recording head and far from the photonic crystal waveguide.

9. The HAMR head of claim 6, further comprising a reading sensor provided at a location which is one of far from the magnetic recording head and far from the photonic crystal waveguide.

10. The HAMR head of claim 6, further comprising at least one cladding layer formed between the magnetic recording head and the photonic crystal waveguide, or on a surface of the photonic crystal waveguide.

11. A method of manufacturing a heat-assisted magnetic recording (HAMR) head, comprising:
    forming a magnetic recording head including a recording pole for applying a magnetic recording field on a magnetic recording medium and a return pole magnetically connected to the recording pole to form a magnetic path; and
    forming an optical transmission module on the magnetic recording head,
        wherein the forming of the optical transmission module comprises:
        depositing a waveguide layer on the magnetic recording head;
        forming a photonic crystal waveguide for guiding light by patterning the waveguide layer; and
        forming a nano aperture on an output region of the photonic crystal waveguide, the nano aperture enhancing an optical field by varying an intensity distribution of the light guided through the photonic crystal waveguide,
    wherein the photonic crystal waveguide includes an optical waveguide line defect region where at least one line of periodicity is removed from photonic crystal having a periodic refractivity and the optical waveguide line defect region is straight or has at least one bend.

12. The method of claim 11, wherein the photonic crystal waveguide is formed through one of a process comprising nano-imprinting and a process of electron beam lithography and dry-etching.

13. The method of claim 11, wherein the forming of the nano-aperture comprises:
    forming a metal layer on the output region of the photonic crystal waveguide;
    forming a photoresist layer on the photonic crystal waveguide where the metal layer is exposed; and
    forming the nano aperture on the metal layer through a focused ion beam process or a dry etching process and removing the photoresist layer.

14. The method of claim 13, wherein the forming of the metal layer comprises:

coating a photoresist layer on the waveguide layer;

exposing the output region of the photonic crystal waveguide, on which the nano aperture will be formed;

developing the exposed region to remove the photoresist layer from the output region;

depositing metal; and removing the remaining photoresist layer such that the metal layer only remains on the output region.

15. The method of claim 11, wherein the photonic crystal waveguide further includes a monitoring optical waveguide line defect region for inducing a part of the light guided by the optical waveguide line defect region to be used as monitoring light.

16. The method of claim 11, wherein the nano aperture enhances the optical field for a specific polarization of light; and the photonic crystal waveguide has a polarization control function for guiding a specific polarization of light so that the optical field can be enhanced by the nano aperture.

17. The method of claim 16, wherein the nano aperture is one of a C-type nano aperture and a slot type nano aperture having a slot and a plurality of grooves formed around the slot.

18. The method of claim 11, further comprising, after the magnetic recording head is formed, forming at least one cladding layer between the magnetic recording head and the optical transmission module.

* * * * *